(12) United States Patent
Heckeroth

(10) Patent No.: US 7,828,099 B2
(45) Date of Patent: Nov. 9, 2010

(54) ELECTRIC TRACTOR

(75) Inventor: Stephen Heckeroth, P.O. Box 151, Albion, CA (US) 95410

(73) Assignee: Stephen Heckeroth, Albion, CA (US)

( * ) Notice: Subject to any disclaimer, the term of this patent is extended or adjusted under 35 U.S.C. 154(b) by 171 days.

(21) Appl. No.: 12/036,469

(22) Filed: Feb. 25, 2008

(65) Prior Publication Data

US 2009/0223724 A1 Sep. 10, 2009

(51) Int. Cl.
*B60R 16/04* (2006.01)
(52) U.S. Cl. .................. 180/68.5; 180/2.2; 180/65.31
(58) Field of Classification Search ............ 180/68.5, 180/2.2, 65.31
See application file for complete search history.

(56) References Cited

U.S. PATENT DOCUMENTS

| | | | |
|---|---|---|---|
| 4,113,045 A | 9/1978 | Downing | |
| 4,365,681 A * | 12/1982 | Singh | 180/68.5 |
| 4,662,472 A | 5/1987 | Christianson et al. | |
| 4,967,864 A * | 11/1990 | Boyer et al. | 180/65.1 |
| 5,301,765 A * | 4/1994 | Swanson | 180/68.5 |
| 5,305,513 A | 4/1994 | Lucid | |
| 5,360,307 A * | 11/1994 | Schemm et al. | 414/343 |
| 5,392,873 A * | 2/1995 | Masuyama et al. | 180/68.5 |
| 5,585,205 A * | 12/1996 | Kohchi | 429/99 |
| 5,612,606 A | 3/1997 | Guimarin et al. | |
| 5,725,062 A * | 3/1998 | Fronek | 180/2.2 |
| 5,743,347 A | 4/1998 | Gingerich | |
| 5,847,537 A | 12/1998 | Parmley | |
| 5,918,692 A * | 7/1999 | Sekita et al. | 180/56 |
| 5,951,229 A | 9/1999 | Hamerslag | |
| 6,313,394 B1 * | 11/2001 | Shugar et al. | 136/244 |
| 6,357,070 B1 * | 3/2002 | Venard et al. | 15/50.1 |
| 6,371,230 B1 | 4/2002 | Ciarla | |
| 6,586,668 B2 * | 7/2003 | Shugar et al. | 136/244 |
| 6,668,957 B2 * | 12/2003 | King | 180/68.5 |
| 6,896,468 B2 | 5/2005 | Gallea | |
| 7,004,710 B1 | 2/2006 | Quade | |
| 7,270,208 B2 * | 9/2007 | Huang | 180/68.5 |
| 7,559,392 B2 * | 7/2009 | Batdorff | 180/68.5 |
| 7,712,563 B2 * | 5/2010 | Niebuhr | 180/68.5 |
| 2009/0014224 A1 * | 1/2009 | Rydberg et al. | 180/68.5 |
| 2009/0223724 A1 * | 9/2009 | Heckeroth | 180/2.2 |

* cited by examiner

Primary Examiner—Jeffrey J Restifo

(57) ABSTRACT

An electric tractor including a frame having a front end and a longitudinal axis between its front and rear ends. At least one drive wheel is provided for propelling the electric tractor and at least one electric motor for powering the at least one drive wheel. A pair of rails extend parallel to one another in a spaced apart relationship along the longitudinal axis and a first battery pack sized to be received in a plurality of locations along the rails, the first battery pack being selectively in electrical contact with the at least one electric motor once received on the rails.

6 Claims, 4 Drawing Sheets

ELECTRIC TRACTOR

TECHNICAL FIELD

The present invention involves an electric tractor and, preferably, a solar powered electric tractor which includes a frame uniquely configured to receive one or more battery packs. The battery packs are employed not only to power the electric tractor but also to act as ballast and counter weight members for stabilizing the tractor when employed in a plurality of configurations including its use as a front end loader and for balancing the weight of implements mounted behind the tractor.

BACKGROUND OF THE INVENTION

Presently, the global food system faces a crises of unprecedented scale as a result of four simultaneously colliding dilemmas, all arising from a relatively recent pattern of dependence on rapidly depleting petroleum. Specifically, higher oil prices has resulted in increased costs for tractor fuel, agricultural chemicals and the transport of farm inputs and outputs. In turning to alternative fuel sources, biofuels result in farm land conversion from food production to fuel production, thus making food more costly. The burning of petroleum fuels causes green house gas emissions leading to less predictable food production. Finally, is the degradation of essential resources such as top soil, fresh water and farming skills resulting from unsustainable methods of production stimulated by decades of relatively inexpensive energy.

Replacing agricultural tractors previously powered by internal combustion engines with electric tractors and, ideally, those electric tractors that are powered by rechargeable batteries which integrate with solar cells has the potential to reduce or eliminate the negative impacts of petroleum dependence. Specifically, the cost of operating a solar electric tractor will not be affected by oil depletion. Solar electric tractors do not depend on the combustion of liquid fuels so that farmland can remain in food production. Solar electric tractors further are zero emission vehicles so that their use will not produce green house gases that cause climate change. Sustainable small farms will replace large scale agribusiness because large fuel intensive machinery will become unaffordable as fuel prices increase. The optimum solar electric tractor is limited only by the amount of energy that can be stored in batteries or generated by solar arrays so the unsustainable energy intensive production methods employed previously will be replaced by serving local markets. A further collateral benefit is that the constant maintenance, noise and pollution associated with gas and diesel tractors, being both a nuisance and health hazard would be eliminated.

In dealing with tractors employing internal combustion engines, the maintenance and upkeep issues inherent in such modes of transportation are eliminated by moving to solar electric tractors. In doing so, one need not be concerned with maintaining an internal combustion engine in optimal and efficient condition. Failure to do so results in idling and stalling problems. No longer does one need be concerned with coolant, oil and filter changes, oil leaks, pollution which is normally dangerous to breath but can affect crops. By contrast, solar electric tractors require low maintenance and are resultingly low in operating costs. They are clean and quiet to operate and are 5 to 10 times more energy efficient than internal combustion engines. Such vehicles can be charged from onsite renewable energy sources. As will be more fully developed in the present application, battery weight can be employed beneficially to counter balance loads imposed upon the tractor as well as to lower the tractor's center of gravity. Electric motors produce higher torque at low speed which is ideal for tractor operation. When individual motors are used on multiple drive wheels, a joy stick can be employed providing a zero radius steering capability. Separate power take off motors can also be employed to increase performance.

It is thus an object of the present invention to provide an electric tractor, and preferably, a solar powered electric tractor which eliminates the limitations imposed upon tractors when employing internal combustion engines.

It is yet a further object of the present invention to provide a frame and geometry for an electric tractor in which battery placement is flexible and can be employed to lower the tractor's center of gravity and act as a counter balance thus eliminating the need for the purchase and installation of dead weight to accomplish these purposes.

These and further objects will be more readily apparent when considering the following disclosure and appended claims.

SUMMARY OF THE INVENTION

An electric tractor comprising a frame having a front end and rear end, a longitudinal axis between said front and rear ends, at least one drive wheel for propelling said electric tractor and at least one electric motor for powering said at least one drive wheel, a pair of rails extending parallel to one another in a spaced apart relationship along said longitudinal axis, a battery pack sized to be received in a plurality of locations along said rails, said battery pack being selectively in electric contact with said at least one electric motor once received on said rails.

DETAILED DESCRIPTION OF THE INVENTION

Figure 1:
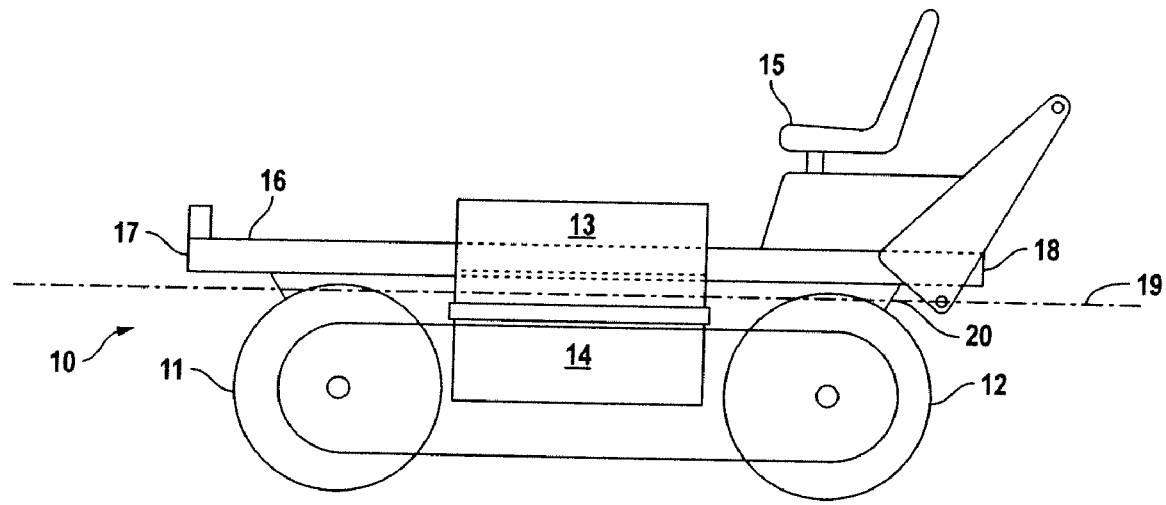
FIG. 1 is a side view of a basic depiction of the electric tractor of the present invention.
Figure 2:
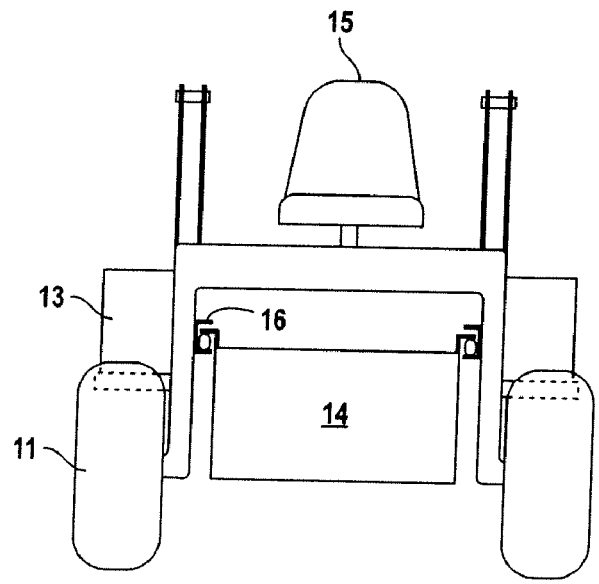
FIG. 2 is a front view of the electric tractor of FIG. 1.

Turning first to FIG. 1, electric tractor 10 is depicted having seat 15 for use by an operator comprising a frame 20 having front end 17 and rear end 18 and longitudinal axis 19 between front end 17 and rear end 18. At least one drive wheel 11/12 is employed for propelling electric tractor 10 and at least one electric motor (not shown), for powering the at least one drive wheel 11/12. A pair of rails 16 extend parallel to one another (FIG. 2) in spaced apart relationship along longitudinal axis 19. A primary battery pack 13 is supported on frame 20 and at least one secondary battery pack 14 is sized to be received in a plurality of locations along rails 16. Primary battery pack 13 and secondary battery pack 14 are in electric contact with said at least one electric motor once installed on the vehicle.

Figure 3:
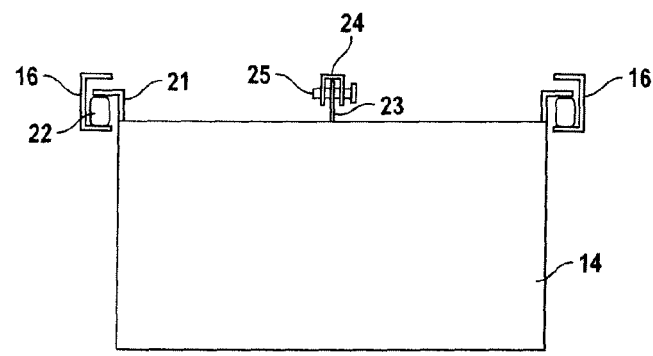
FIG. 3 is a front view of a battery pack and interface when supported by the electric tractor of FIG. 1.

Turning to FIG. 3, secondary battery B and its interface with the vehicle is shown in greater detail. Specifically, secondary battery 14 is supported on frame 20 through the use of parallel extending rails 16. Secondary battery 14 includes L-shaped brackets 21 which extend within C-shaped rails 16 and are thus held thereby. Ideally, rollers 21 are provided between L-shaped brackets 21 and rails 16 to enable secondary battery 14 to slide along rails 16 for reasons which will be described hereinafter. Once the appropriate positioning of battery 14 along rails 16 is selected, vertical extension 23 is receiving by U-shaped bracket 24 and locked into position through the use of pin or bolt 25.

Secondary battery 14 is ideally installed within electric tractor 10 upon rails 16 by positioning secondary battery 14 onto a jack at either the front or rear of the vehicle. The electric tractor is then moved to enable L-shaped bracket 21 to slip within rails 16 as shown in FIG. 3 whereupon the jack is lowered to enable L-shaped bracket 21 to be suspended either directly upon rails 16 or rollers 22. Electrical contact is then made between secondary battery 14 and the onboard electric motors used to power one or more of drive wheels 11/12, etc.

It should be quite apparent that the configuration of the present electric tractor offers certain benefits over and above previously described vehicles; even those in which internal combustion-petroleum consuming motors have been replaced with their electric counterparts. In this regard, reference is made to FIG. 4. By suspending secondary battery 14 below rails 16 upon frame 20, the center of gravity of tractor 40 is lowered. In doing so, greater stability, increased traction and balance in terms of counter weighting tractor implements is also provided.

In the past, when rear loader assembly 41 was appended to frame 20 and was used to lift mass 42, dead weight would be purchased and installed proximate the forward end of tractor 40 to prevent it from tipping when rear assembly 41 was employed to lift object 42. Now however, by sliding secondary battery 14 proximate forward edge 43 of tractor 40, the battery alone is used to not only power tractor 40, but also to counter balance the assembly at the rear of the vehicle. No longer is one called upon to install dead weight but can employ the very power source used to power onboard electric motors for this purpose. Further, suspending battery 14 below rails 16 lowers the overall center of gravity of tractor 40 resulting in obvious benefits.

Figure 4:
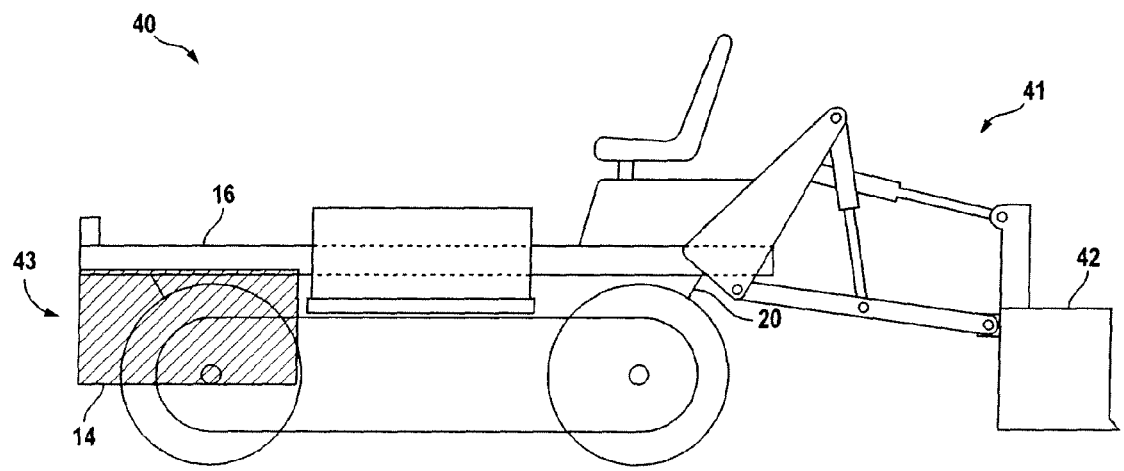
FIG. 4 is a side view of a further embodiment of the present invention where the electric tractor is used to support a rear load.
Figure 5:
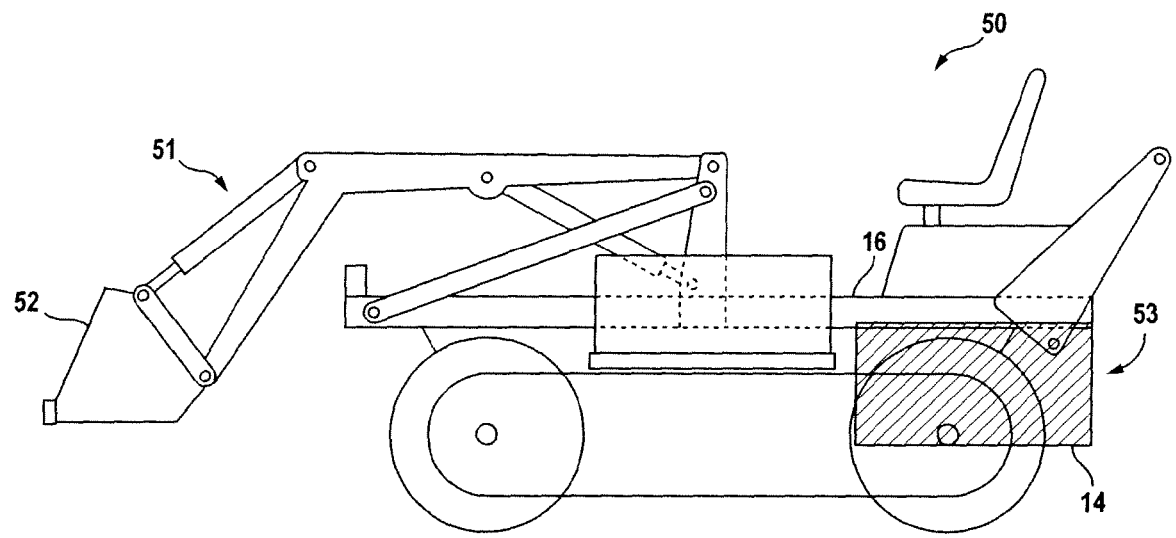
FIG. 5 is a side view of a further embodiment of the electric tractor of the present invention configured with a front loader assembly.

Reference is made to FIG. 5 which depicts the converse of the invention disclosed in FIG. 4. Specifically, tractor 50 is now configured with front end loader assembly 51 including shovel 52. Whenever shovel 52 is called upon to capture a weighted mass, the operator of tractor 50 would be called upon to purchase and install dead weight proximate rear end 53 of vehicle 50 to prevent tractor 50 from tipping causing its rear wheel to leave the ground. However, secondary battery 14 being slideable upon rails 16 can be positioned proximate rear end 53 to obviate the need for such dead weight.

Figure 6:
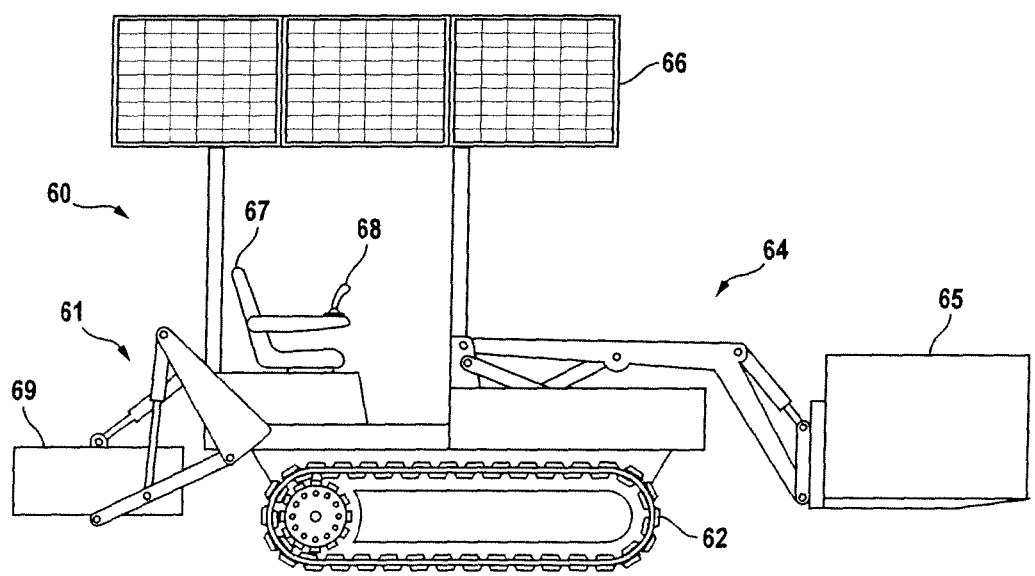
FIG. 6 is a side view of the electric tractor of the present invention showing the use of a solar array and the use of a battery pack supported at the rear of the tractor to counter balance a front load.
Figure 7:
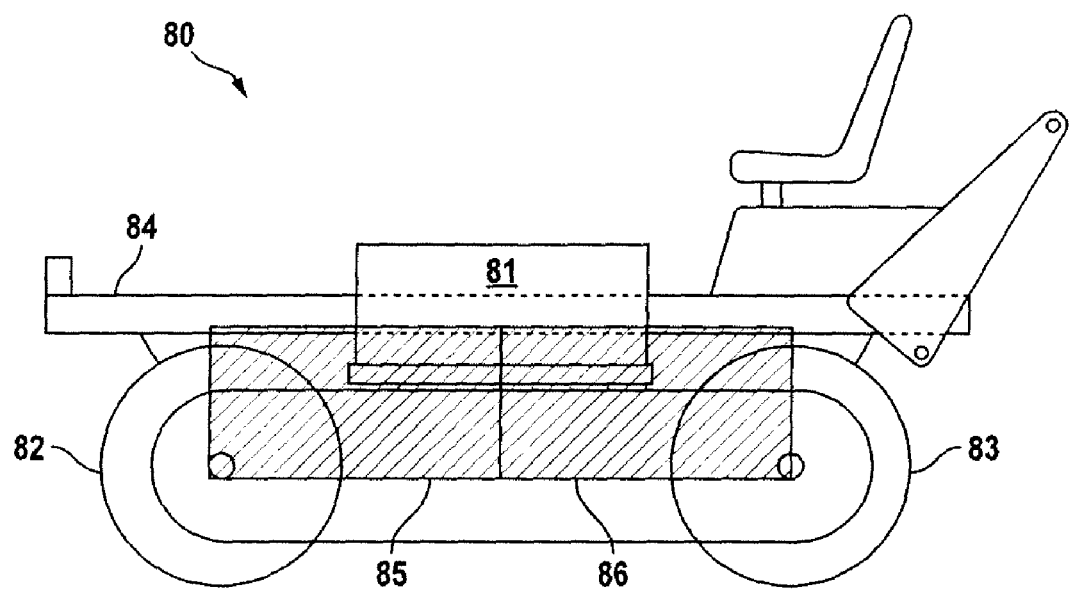
FIG. 7 is a side view of the electric tractor of the present invention showing multiple secondary batteries to lower the tractor's center of gravity.

In turning to FIG. 6, it is noted that, in extreme conditions, in which tractor 60 is provided with front loader assembly 64 maintaining a heavily weighted object 65, secondary battery 69 can actually be suspended from three point hitch assembly 61 thus further counter balancing at the tendency of front loader assembly 64 and weight 65 to tip tractor 60. FIG. 6 also shows the use of a solar panel array 66 which can be employed as a shade canopy as shown. An operator (not shown) would be situated beneath canopy 66 using joy stick 68 to operate the vehicle.

It is further noted that both traction and compaction are overriding concerns in the design of agricultural tractors. Traction and compaction are both determined by the tractor weight divided by the area of the wheel or track in contact with the soil. Ample, controlled low speed torque is also required to prevent the tractor wheels from spinning. To a lesser extent, the condition of the soil and the depth and spacing of the tread design can also have an additional affect on traction and compaction. Wheeled tractors have a relatively small foot print when compared to tractors with tracks, called crawlers. The amount of soil compaction is a function of how much the tractor weighs divided by the area of contact with the ground, expressed in pounds per square inch (psi). FIG. 6 shows track 62 as a preferred embodiment of the present invention.

Figure 8:
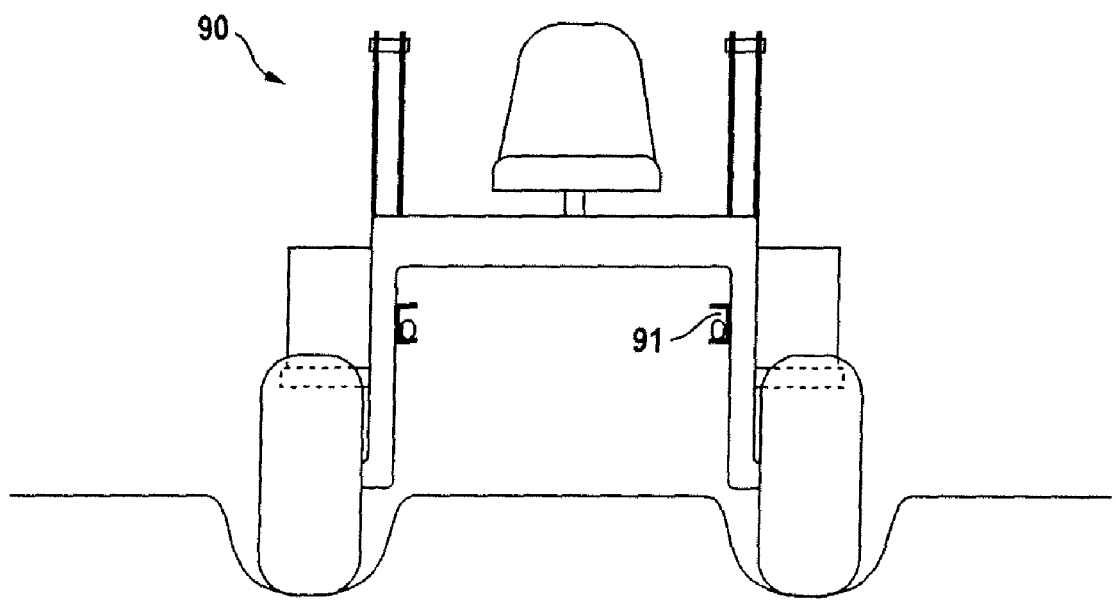
FIG. 8 is a front view of the tractor of the present invention without a secondary battery pack to show the clearance afforded by this vehicle in use.

In turning to FIG. 8, reference is made to electric tractor 80 again including primary battery 81 and wheels 82/83, etc. Parallel rails 84 are provided similar to rails 16 of FIG. 1. In this instance, secondary batteries 85 and 86 are supported thereon noting, in this instance, that multiple secondary batteries can be employed on a single set of rails. These batteries assist in lowering the center of gravity of tractor 80 and can be slid fore or aft of the vehicle along rails 84 as counter weights as needed. One or both batteries can be electrically connected to suitable motors as an adjunct to electrical power made available from primary battery 81.

In turning to FIG. 9, it is noted that tractor 90 although including rails 91 are devoid of secondary batteries. This is a configuration ideally suited for light duty applications that require high clearance and low compaction such as when planting and harvesting. Such a configuration would allow electric tractor 90 to operate over rows of plants and under wet conditions without causing damage to crops or soil. Obviously, tractor 90, once having completed its light duty, high clearance operations, can receive suitable secondary batteries by virtue of rails 91 for operations as previously described,

What is claimed is:

1. An electric tractor comprising a frame having a front end and rear end, a longitudinal axis between said front and rear ends, at least one drive wheel or track for propelling said electric tractor and at least one electric motor for powering said at least one drive wheel or track, a pair of rails extending parallel to one another in a spaced apart relationship along said longitudinal axis, at least one exchangeable battery pack sized to be received in a plurality of locations along said rails, said at least one battery pack being selectively in electrical contact with said at least one electric motor once received on said rails, said at least one exchangeable battery pack being positionable and mechanically lockable by at least one first solid pin positioned through at least one first hole of a plurality of holes in said rails aligned with at least one second hole of a plurality of holes in said at least one battery pack frame in a plurality of locations from said front end to said rear end of said electric tractor along said rails such that said at least one battery pack can be positioned and locked in place in order to counter balance the weight of implements or other loads and add weight for traction on said electric tractor.

2. The electric tractor of claim 1 comprising an exchangeable battery pack positionable and lockable by said at least one first solid pin through aligned holes on the tractor and said battery pack frame in locations other than said rails.

3. The electric tractor of claim 1 further comprising a plurality of exchangeable battery packs simultaneously positionable and lockable by said at least one first solid pin, and at least one second solid pin.

4. The electric tractor of claim 1 wherein said battery pack is positioned and lockable by said first and second solid pins such that the center of gravity of said electric tractor is lowered thereby.

5. The electric tractor of claim 1 wherein a permanently mounted battery pack can be selectively in electric contact with said at least one electric drive motor to felicitate the loading, unloading or positioning of at least one secondary exchangeable battery pack.

6. The electric tractor of claim 1 further comprising a plurality of rollers located between said battery pack and said pair of rails to facilitate slideable positioning of said battery pack along said frame.

* * * * *